(12) United States Patent
Steinke

(10) Patent No.: US 6,679,306 B2
(45) Date of Patent: Jan. 20, 2004

(54) RUN FLAT TIRE WITH AN ELASTOMERIC INNER SUPPORT

(75) Inventor: Richard A. Steinke, Boulder City, NV (US)

(73) Assignee: Amerityre, Boulder City, NV (US)

( * ) Notice: Subject to any disclaimer, the term of this patent is extended or adjusted under 35 U.S.C. 154(b) by 136 days.

(21) Appl. No.: 10/006,417

(22) Filed: Dec. 10, 2001

(65) Prior Publication Data

US 2003/0106626 A1 Jun. 12, 2003

(51) Int. Cl.$^7$ .......................... B60C 17/00; B60C 17/04
(52) U.S. Cl. ..................... 152/520; 152/516; 152/331.1
(58) Field of Search ................................. 152/516, 517, 152/518, 519, 520, 157, 158, 331.1

(56) References Cited

U.S. PATENT DOCUMENTS

| | | | |
|---|---|---|---|
| 450,816 A | 4/1891 | Overman | |
| 464,767 A | 12/1891 | Woodward | |
| 612,583 A | 10/1898 | Davidson | |
| 1,014,318 A | 1/1912 | Merriman | |
| 1,056,976 A | 3/1913 | Divine | |
| 1,178,887 A | 4/1916 | Thoens | |
| 1,194,177 A | 8/1916 | Henderson | |
| 1,670,721 A | 5/1928 | Hitchner | |
| 3,250,310 A | * 5/1966 | Johnson | ....................... 152/158 |
| 3,533,662 A | 10/1970 | Richards et al. | |
| 3,814,158 A | * 6/1974 | Ryder | ......................... 152/158 |
| 3,948,303 A | 4/1976 | Patrick | |
| 4,246,948 A | * 1/1981 | Sarkissian | ................. 152/340.1 |
| 4,855,096 A | 8/1989 | Panaroni | |
| 4,943,223 A | 7/1990 | Panaroni | |
| 5,229,047 A | 7/1993 | Becker | |
| 5,341,861 A | * 8/1994 | Forte | ......................... 152/158 |
| 5,524,913 A | 6/1996 | Kulbeck | |
| 5,906,836 A | 5/1999 | Panaroni et al. | |
| 6,165,397 A | 12/2000 | Panaroni et al. | |

FOREIGN PATENT DOCUMENTS

| | | | |
|---|---|---|---|
| DE | 3439949 | * | 5/1986 |
| EP | 0663306 | * | 7/1995 |
| FR | 338920 | | 7/1904 |
| FR | 367981 | | 11/1906 |
| GB | 23 67-1878 | | of 1878 |
| GB | 34 32-1881 | | of 1881 |
| GB | 11800 | | of 1889 |
| GB | 14997 | | of 1897 |
| GB | 20186 | | of 1900 |
| GB | 27224 | | of 1902 |
| JP | 63251306 | * | 10/1988 |

OTHER PUBLICATIONS

Ulrich, Henri. Polyurethane, "Modern Plastics Encyclopedia": vol. 54, No. 10A, Oct. 1977, pp. 86–97.*

* cited by examiner

Primary Examiner—Michael W. Ball
Assistant Examiner—Justin Fischer
(74) Attorney, Agent, or Firm—M. Reid Russell

(57) ABSTRACT

A run flat tire that includes a tire casing and an inner support fitted within which tire casing, with the inner support to support the tire casing load upon run flat tire deflation. The tire casing and inner support are for mounting to a rim, the tire casing side wall bead ends to fit against side wall ends of the inner support that are maintained against rim interior stepped sections. The inner support is formed from an elastomeric material, preferably by casting or molding methods, to include an interior arch shaped cavity centered under the inner support outer surface having at least one hundred forty (140) degrees and not more than one hundred eighty (180) degrees of arc, and has a uniform thickness between the inner support inner and outer surfaces that is selected to support a particular anticipated load, after tire deflation, to support, in compression, the tire load for a target distance and speed. The run flat tire includes a valve stem that passes air into the inner support that travels through holes formed through the inner support side walls.

11 Claims, 6 Drawing Sheets

RUN FLAT TIRE WITH AN ELASTOMERIC INNER SUPPORT

BACKGROUND OF INVENTION

1. Field of the Invention

This invention pertains to run flat pneumatic tires where the tire includes a load bearing inner support structure to support, in compression, a tire load should the pneumatic tire lose pressure, allowing the vehicle mounting the tire to safely travel a target distance of at least fifty miles, at a speed of at least fifty miles per hour.

2. Prior Art

A recent rash of catastrophic automobile accidents attributed to rapid pneumatic tire deflation have resulted in a greatly increased interest in producing a pneumatic tire that, even after a rapid deflation, will safely support a load carried by the tire so as to allow the vehicle mounting the tire to make a controlled stop and to even to continue to travel on that deflated tire, at a moderate speed, for a sufficient distance to find a repair facility. Which moderate speed has been selected as fifty to fifty five miles per hour, for a target distance to be traveling on the deflated tire set at approximately fifty miles. To the end of providing such a tire, most, if not all, the major tire manufacturers, have developed or are in the process of developing, a run flat tire. To date, however, pneumatic tires as have been developed and even marketed have generally failed to safely meet the target speed and distance, and such, in practice, have not been reliable at the target speed over the target distance, and are very expensive. Examples of run flat pneumatic tires are shown in FIGS. 1 and 3, that are identified as Prior Art, of the present application. Shown in FIG. 1 is a run flat tire like that as has been developed by Michelin identified as a "Zero Pressure Tire" that includes multiple plys to create stiff side walls; and, the tire shown in FIG., 3, is a pneumatic tire that has also developed by Michelin and includes an annular elastomeric block fitted within the tire, around the rim web, that the tire tread will collapse onto upon deflation.

The above set out tires, as shown in FIGS. 1 and 3, are believed to represent the current state of development of run flat type tires, with similar pneumatic tire concepts being developed by other major tire manufacturers. None of which run flat pneumatic tires, in practice, have consistently safely met the target criterion for the reason that the deflated tire, under load, collapses, with the tire side walls then flexing rapidly as the tire continues to turn under load, "working" the tire side wall, and creating a heat buildup that, in a short time period, results in tire failure to destruction. In all the run flat tires, prior to the present invention, at low or no pressure, the tire side walls will, after travel at speed over time, experience a heat buildup with continued flexure, resulting in tire destruction.

Unique from all the earlier run flat pneumatic tire embodiments, the invention provides an inner support that is load bearing and is fitted within the tire casing, mounted to the rim. The inner support, by itself and at atmospheric pressure only, is capable of support the load carried by the pneumatic tire when the pneumatic tire is deflated. Without only ambient air therein, the inner support maintains the rolling tire load with minimum tire side wall flexure and, accordingly, a lesser heat buildup from flexure of the deflated pneumatic tire over the target distance, at the target speed. The inner support, provides load bearing strength in compression due to its arch shaped interior cavity construction and its mounting to the rim. Further, with the inner support mounted within the pneumatic tire casing, the inner support outer portion surface is proximate to the pneumatic tire thread undersurface, and further act as a shock absorber in normal operations when the pneumatic tire is "aired-up". Which the inner support is contacted by the pneumatic tire tread undersurface, supporting the tire load, should the pneumatic tire lose pressure. Accordingly, the inner support will immediately take up the tire load at a loss of tire pressure, minimizing a likelihood of loss of vehicle control, even where the tire deflation is instantaneous. Because of the minimum distance of travel of the tire casing tread to contact the inner support outer surface, tire casing side walls will experience minimum added flexure after pneumatic tire deflation, greatly lessening a heat build up with continued rolling of the tire under load in traveling to the target distance, at the target speed.

The preferred inner support is essentially a tire like structure, that, at atmospheric pressure only, has an inherent load bearing or supporting strength that is like that of a pneumatic tire under a pressure of from thirty five to forty psi. In practice, an elastomeric tire type structure that is preferred as the inner support is set out in a U.S. Patent, entitled, "Air-No-Air Elastomeric Tire," Ser. No. 09/943, 814, filed Sep. 4, 2001. Which tire, for use as an inner support, has been modified by drilling holes at spaced intervals through the tire side walls to pass air as is injected therein through a valve stem that is fitted through the rim, into the inner support arch shaped cavity. The Air-No-Air Elastomeric Tire, for use as an inner support, has its side wall mounting ends that are maintained in a rim, between the pneumatic tire casing bead ends and rim inner walls. So arranged, upon a decompression of the pneumatic tire casing to where the tread drops into engagement with the inner support tread surface, the inner support will support the load carried by the pneumatic tire casing. In which support attitude, the inner support side wall ends compress the pneumatic tire casing bead ends against outer hook ends of the rim, prohibiting a separation of the pneumatic tire casing bead off of the rim.

Solid, cavity free, non-pneumatic tires formed from an elastomeric material have been in use for many years going back to as early as 1878, as set out in a British Patent No. 2,367, that shows a solid rubber tire and rim. Even where such rubber tires have been formed to include inner cavities, like the inner support of the invention, such as U.S. Pat. Nos. 450,816 and 464,767, such tires have not been utilized as inner supports for a for a conventional pneumatic tire to form a run flat type tire. A U.S. Pat. No. 1,014,318, shows in FIG. 1, an elastomeric tire having an arch shaped cavity that is maintained as a tire between hook ends of a rim. However, there is no discussion in this patent of, nor does the patent imply, an association of such elastomeric tire with a pneumatic tire casing to form a run flat tire. Finally, while cavities are shown in the tires of U.S. Pat. Nos. 3,948,303 and 5,524,913, these patents are directed to tire mountings to a rim and there is no discussion of load bearing capabilities of the tire, nor that the tire could be used as an inner support for a run flat type tire. Only the present invention has recognized the load bearing capabilities of an elastomeric inner support having an arch shaped center cavity and its use as the core of a run flat type tire.

A number of other earlier patents have involved non-pneumatic tire and tire and rim combinations. None, however, teach or imply a combination of an inner support like that of the invention for inclusion with a pneumatic tire casing. For example, British Patents No.'s 3,432; 15,439; 20,186; and 27,224; French Patents No.'s 338,920 and 367,981 and U.S. Pat. Nos. 1,056,976; 1,178,887; 3,533,662 and 5,229,047, are all directed to non-pneumatic tires that do not include arch shaped inner cavities. Also, non-pneumatic tires that do not include a center cavity are shown in earlier U.S. Pat. Nos. 4,855,096 and 4,943,323, and in U.S. Pat. Nos. 5,906,836 and 6,165,397 that were co-invented by the present inventor. Additionally, while a number of earlier patents show non-pneumatic tires that include inner cavities, for example: British Patent No.'s 11,800 and 14,997; and U.S. Pat. Nos. 1,194,177 and 1,670,721, these patents do not show tires having arch shaped inner cavities that could be used as an inner support for a pneumatic tire casing to form a run flat tire. Rather, the cavities of these patents are for allowing compressions of the tire side walls and bead sections so as to provide for a fitting of the tire onto a rim, and for cushioning. Prior to the invention, non-pneumatic tires having an arch shaped inner cavity with a load bearing capability as governed by wall thickness have not been used as an inner support for fitting in a pneumatic tire casing as an inner support of a run flat tire.

SUMMARY OF THE INVENTION

It is a principal object of the present invention to provide a run flat type pneumatic tire having a tire outer casing that is for mounting by beads onto a rim, and includes an elastomeric inner support that is maintained within the outer casing that is also mounted to the rim, adjacent to the tire casing beads, that will be contacted by the pneumatic tire casing inner surface under the tread upon tire casing deflation, supporting the load as the tire carries for a target distance and speed.

Another object of the present invention is to provide a run flat type pneumatic tire that includes an outer tire casing having beads embedded in its side wall ends for mounting in a rim and includes also for mounting an elastomeric inner support that has a tire shape fitted within the tire casing and also mounted to the rim, which inner support is preferably formed by molding methods to include an internal arch shaped cavity that is centered under the tire tread and provides structural support to receive a load from the tire casing upon deflation to transfer said load through the inner support side walls and into the rim, supporting the load as the pressurized casing supported Another object of the present invention is to provide a run flat tire where the inner structure with the arch shaped interior cavity includes spaced holes formed through the inner support side walls for passing air under pressure received therein as through a valve stem, into the outer tire casing.

Another object of the present invention is to provide, as the run flat pneumatic tire inner support, an elastomeric tire like structure having a center arch shaped cavity where the distance between the center cavity wall and the outer surface is constant, providing a uniform wall thickness that is selected to support a design load when the cavity is at atmospheric pressure Still another object of the present invention is to provide, as the inner support, an elastomeric tire like structure having an arch shaped cavity formed within the tire to have a uniform arc, with side walls and a top section of a same thickness, which thickness is selected for a load as the inner support will carry upon deflation of the tire casing, and the arc of which arch shaped cavity is uniform arc of from one hundred forty (140) to one hundred eighty (180) degrees from the center of a line across the inner structure between support points to a rim whereto the inner support in mounted.

Still another object of the present invention is to provide an elastomeric inner support that is preferably formed by molding methods to fit within the pneumatic tire casing to have a spacing distance between the inner support outer surface and the pneumatic tire interior surface, under the tread, that, when the pneumatic tire is under pressure for a selected load, will be from one quarter to one eighth of an inch, the narrow distance limiting the pneumatic tire casing side wall amount of folding upon itself before engagement of the tire casing surface, below the tread, with the inner support top surface.

Still another object of the present invention is to provide an elastomeric inner support for fitting within a tire casing, with the inherent load supporting characteristics of the inner support enhanced by an addition of plys, a belt or belts, formed in the inner support during its manufacture and can further include beads formed within the ends of the inner support side walls, and which inner support side walls ends are for fitting in the rim between the tire casing bead ends and opposing surfaces formed that are around the rim annular portion, spaced apart across the rim web.

Still another object of the present invention is to provide an elastomeric inner support for fitting in a pneumatic tire casing, with the inner support to include randomly spaced holes formed through both the inner support side walls within and below an arc of thirty degrees taken from a tire casing center line, and from a line across tire casing sides support points to the rim.

Still another object of the present invention is to provide a run flat tire that includes an elastomer inner support fitted in a pneumatic tire outer casing that, with its proximity to the inner surface of the pneumatic tire casing, will provide shock absorbency to cushion shocks as pass through the tire casing tread or side wall or walls during travel, as from contact with road hazards, with such forces directed into and absorbed by the inner support of the run flat pneumatic tire that is under pressure.

The present invention is in a unique run flat pneumatic tire that, to provide load bearing support after pneumatic tire deflation, the invention employs an inner support to take up and support the pneumatic tire load. Which inner support is preferably formed of an elastomeric material, by molding methods, from natural or synthetic rubber, urethane, or the like. Which molding process is preferably by a spin casting process, or processes, like those set out in U.S. Pat. Nos. 4,855,096 and 4,943,323 and in U.S. Pat. Nos. 5,906,836, and 6,165,397, that the present inventor is a joint inventor of, and improvements thereto. With the finished inner support being like the elastomeric tire, less the tread, as shown and described in a U.S. Patent Application of the present inventor entitled, "Air-No-Air Elastomeric Tire, Ser. No. 09/943,814 filed Sep. 4, 2001.

The inner support is formed to have an arch shaped inner cavity has a uniform radius taken from a point that is a crossing of a horizontal line across end portions of the support side walls that are proximate to and align with tops of a rim interior support walls, and a center vertical line that bisects the inner support, and the inner support outer surface is equidistant from the arch shaped cavity inner surface. For the inner support to be capable of supporting the run flat pneumatic tire casing load, upon pneumatic tire casing deflation, the inner support arch shaped cavity surface is formed to have a uniform arc of at least one hundred forty (140) degrees, and up to an arc of one hundred eighty (180) degrees, as taken from the center of aligned points across the inner support sides whereat the inner support ends are maintained in the rim, and with the outer surface of the inner support following the arc of the inner cavity.

The run flat tire includes a pneumatic tire casing that is essentially a conventional tubeless tire casing preferably includes beads belts and plys and is maintained to a rim at mounting points formed around the rim sides. The inner support is fitted in the pneumatic tire casing with side wall ends thereof maintained between the tire casing bead ends and an interior stepped portion of the rim. Accordingly, with the pneumatic tire casing aired to a design pressure, the inner support ends are each sandwiched between the tire casing bead inner surface and a rim interior stepped portion. To provide air under pressure to inflate the pneumatic tire casing the inner support has holes formed in spaced relationship through its side walls, at random intervals below a thirty degrees arc drawn from the center of a straight horizontal line that passes through the junction of the inner support ends to the rim stepped portions. Within the thirty degree arcs, the air holes are randomly formed through the inner support side walls. So arranged, air under pressure, as is passed into the inner support through a valve stem that has been fitted in the rim, travels into the tire casing.

The distance between the inner support cavity inner and outer surfaces, or thickness, is uniform around the inner support from the inner support junctions with the tops of the rim side walls. This distance or thickness, along with a preferred elastomeric chemical combination, is selected for a particular load as the inner support will maintain, should the pneumatic tire casing deflate, and is a greater thickness as the anticipated load is increased. So arranged, the cavity arch provides a load bearing structural support to the deflated casing that will experience only a minimal distance of collapse, greatly reducing the side wall folding that produces side wall flexure hysteresis, or heat build-up, during continued rolling, under load. Additionally, to further increase the inherent load bearing capability of the un-inflated inner support, the inner support side walls across and under the outer surface can be reinforced by the inclusion of plys and/or one or more belts, and, as+required, and the inner support can include beads. Which plys, belt or belts, and beads are preferably cast within the inner support and become an integral part thereof.

Still other benefits and advantages of the invention will become apparent to those skilled in the art to which it pertains upon a reading and understanding of the following detailed specification.

DESCRIPTION OF THE DRAWINGS

The invention may take physical form in certain parts and arrangement of parts, and a preferred embodiment of which will be described in detail in this specification and illustrated in the accompanying drawings, which form a part hereof.

DETAILED DESCRIPTION

Figure 1:
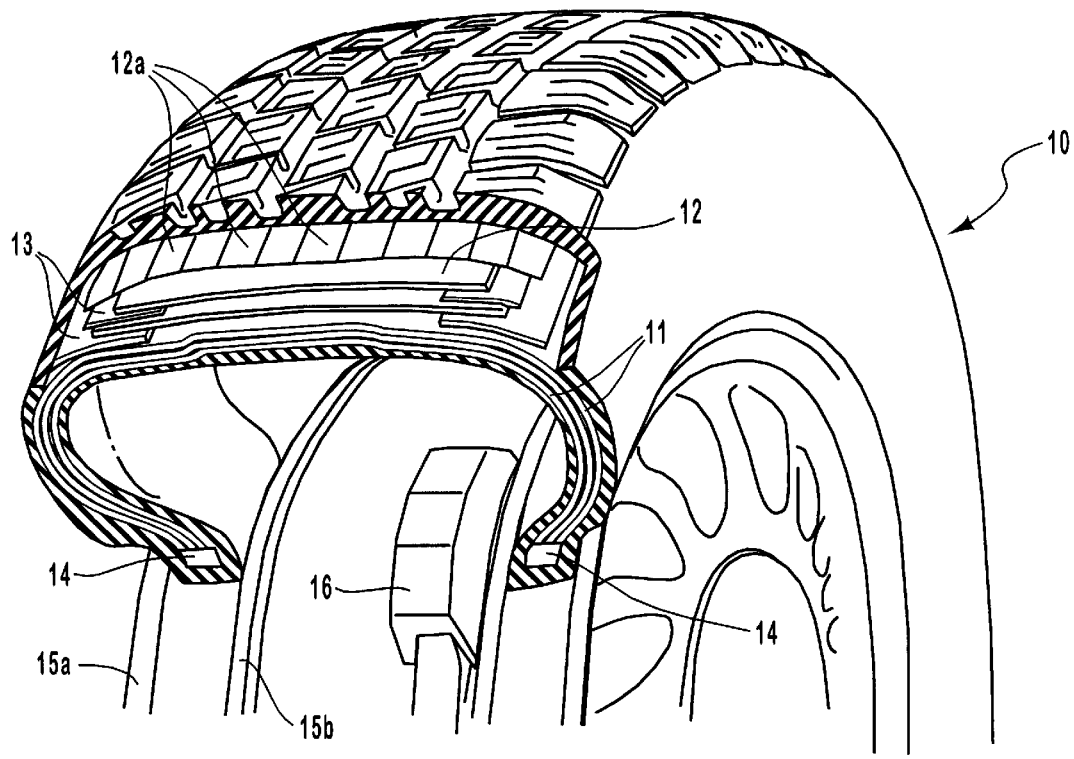
FIG. 1, is identified as Prior Art, and shows an end section of a conventional run flat type tire that is currently being manufactured and sold, the section exposing the tire interior as having reinforced side walls and belts to maintain tire shape, and includes large beads that are maintained between outer and inner rim stepped portions to maintain the tire mounting onto the rim after deflation.
Figure 3:
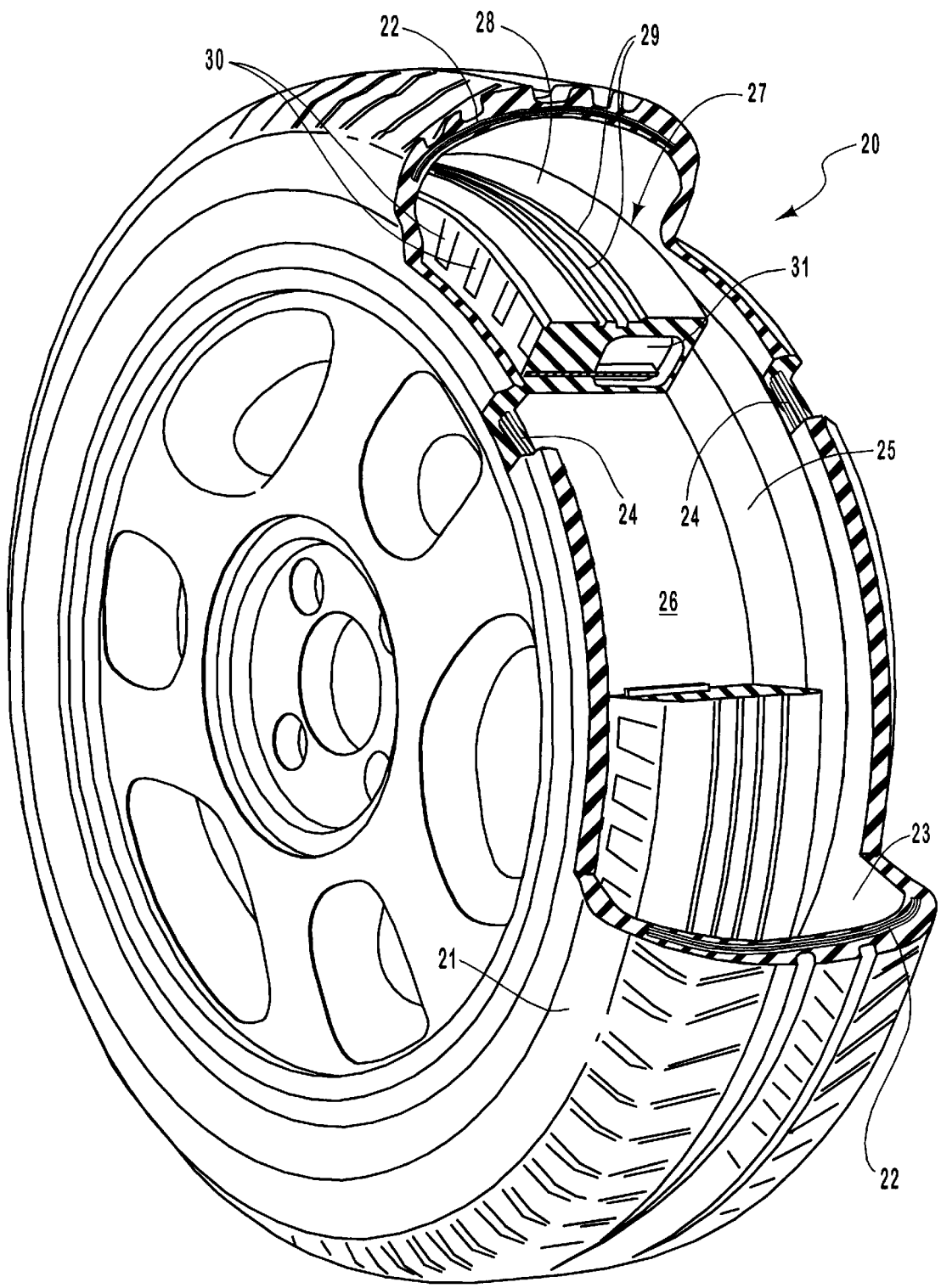
FIG. 3, is identified as Prior Art, and shows another run flat type tire that is currently being manufactured and sold wherefrom an outer section has been removed, exposing a rubber ring fitted between the tire side walls and is supported to an annular portion of the tire rim, which rubber ring receives the tire tread section collapsed thereagainst upon tire deflation, supporting the tire tread section and the load carried thereon upon a tire deflation.

FIGS. 1 and 3, identified as Prior Art, are included to illustrated the state of the art of run flat type tires, or tires that, after deflation, can continue to travel along a road surface, bearing a vehicle weight, for a target distance. With one such target distance and speed being a distance of fifty miles at a speed of fifty to fifty five miles per hour. FIG. 1 shows a tire 10 that is like one manufactured and sold by Michelin as a "Zero Pressure Tire" that incorporates reinforced side walls 11 that are formed of sections of low hysteresis type rubber that are bonded together to provide self supporting side wall strength at tire deflation. Further, the tire 10 crown 12, above belts 13, is shown as folded longitudinally at 12a to provide positive handling on deflation. Further, the tire 10 is shown as including special beads 14, that are shown as having rectangular cross sections, and are to provide for a secure tire seating between rim outer and inner walls 15a and 15b, to hold the tire on the rim after deflation. Additionally, to warn a driver of a low pressure condition as could result in tire instability and deflation, the tire 10 includes a tire pressure monitor 16 that is fitted within the tire to transmit pressure status to a dashboard indicator, or other remote indicator as the driver monitors. The combination of the side wall reinforcement with low hysteresis type rubber, a special crown and special beads provides for tire stability, keeping it on the rim after deflation, allowing it to continue rolling while supporting a load.

FIG. 3, also identified as Prior Art, shows another "Zero Pressure Tire" design by Michelin, that is identified as run flat tire 20, and includes a tire casing 21 with belts 22, plys 23 and beads 24, with the tire 20 shown mounted onto a rim 25 that includes an annular center track 26. A rubber rectangular support ring 27 is shown as having a rectangular cross section and is fitted in the annular track 26, with the support ring 27 shown as including an upper or top surface 28 that will receive the under surface of the tire casing, below the belts 22, upon a tire 20 deflation. Additionally, the support ring 27 upper or top surface 28 can be longitudinally grooved, shown at 29, to engage the tire casing undersurface below the tread as a friction surface to limit side to side movement of the casing across the support ring 27 during tire travel after deflation. Radial holes or depressions 30, as shown, can be formed in the support ring sides for dissipating heat and a port 31 is shown formed within the support ring 27 as an air passage from a valve stem into the tire interior, for airing up the tire 20.

Figure 2:
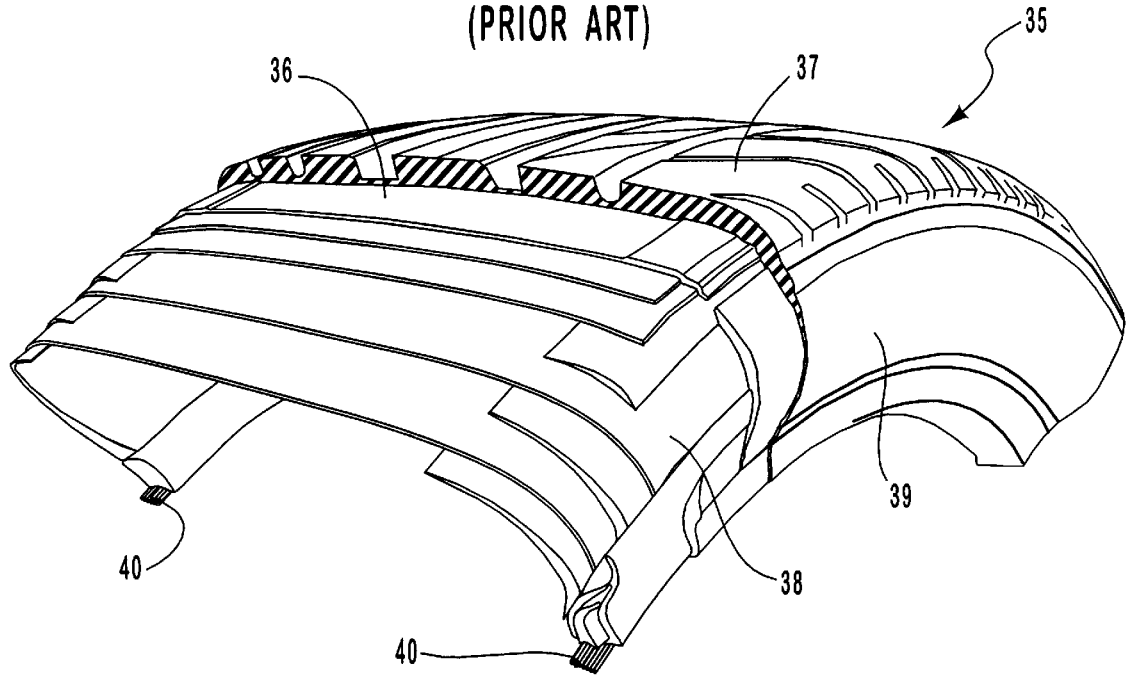
FIG. 2, is identified as Prior Art, and shows an end section of a conventional pneumatic tire as could be arranged as a run flat tire casing that includes, as shown in FIG. 4, an inner support, forming the run flat tire of the invention.

In practice, at deflation, both the tires 10 and 20 side walls will bow outwardly under the load carried by the tire. This occurs whether the tire side walls are reinforced, as with tire 10, or with the tire load supported on the support ring 27, for tire 20. The tire casing, on continued turning under load, flexes outwardly as it is turned from a load engaging attitude to inwardly as the tire turns to a load bearing attitude. The side walls of both tires are thereby constantly flexing as the tire, under load, is turned, creating hysteresis or heat generation that builds up, and, over time, will destroy each of the tires 10 and 20. In practice, both of the tires 10 and 20 have failed to consistently meet the target criterion of being able to safely support a vehicle load for a target distance of fifty miles and at a speed of from fifty to fifty five miles per hour. FIG. 2 shows a tire casing 35 that includes belts 36, located beneath a tread 37, with plys 38 maintained within the tire side walls 39, and including beads 40 that are suitable for the casing. As shown in FIGS. 4 through 9, the tire casing 35, with an inner support 46 fitted therein are mounted onto a rim 54 that is, of course, a vehicle rim, forming a run flat tire 45.

Figure 4:
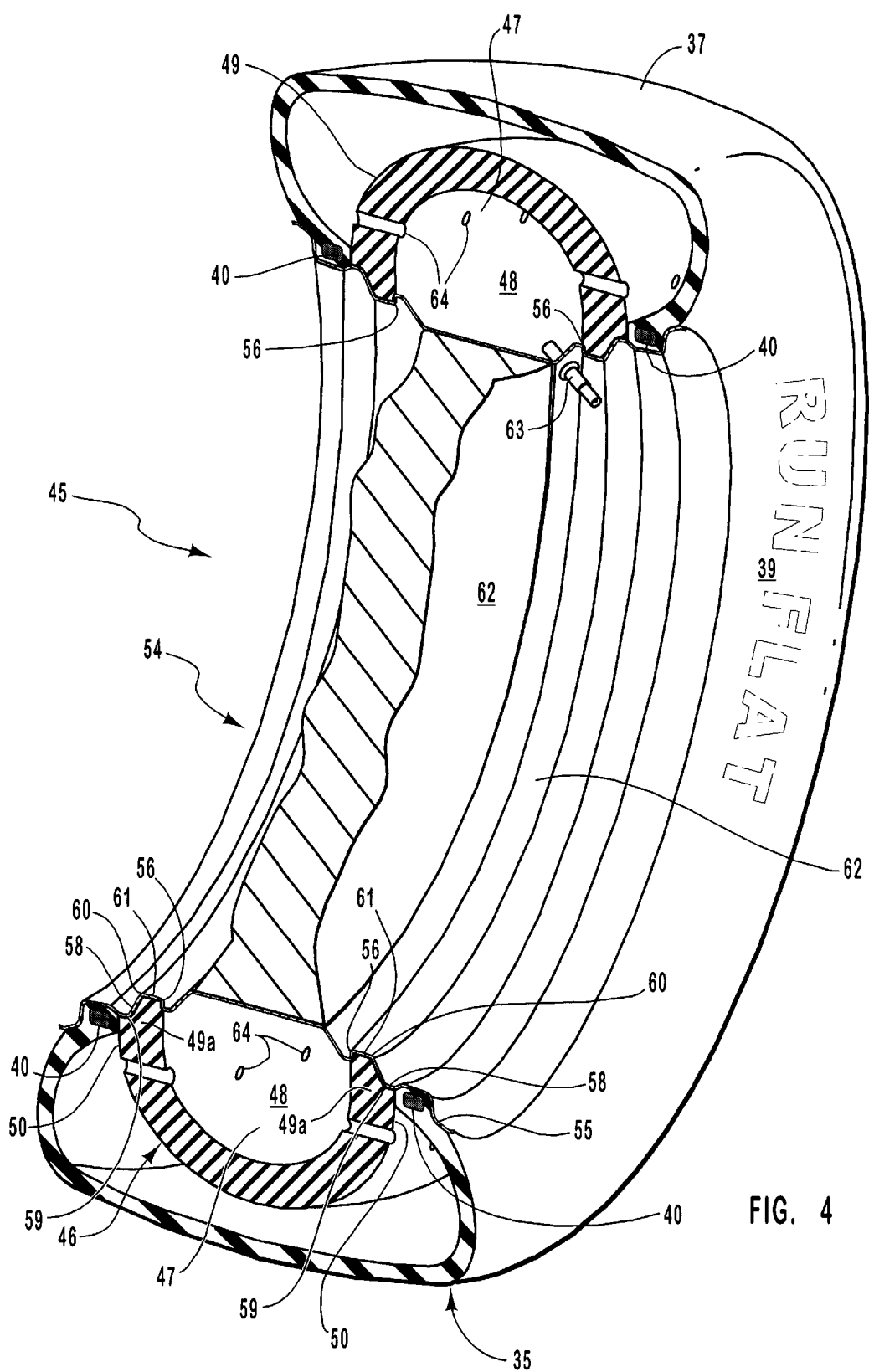
FIG. 4, shows an end sectional view of the run flat tire of the invention as including an outer pneumatic tire casing that is mounted at bead ends to outer portions of sides of a rim, which tire casing bead ends interior surfaces are maintained against side wall ends of the inner support that is, in turn, held in place by rim stepped portions, and which inner support is shown as formed of an elastomeric material to have a tire shape and includes an arch shaped interior cavity, with a uniform thickness, and includes a plurality of randomly spaced holes formed through side walls of the inner support and showing a valve stem mounted through the rim to pass, air under pressure, into the inner support that travels through the spaced holes into the tire casing.

FIG. 4 shows a preferred embodiment of run flat tire 45 that includes the inner support 46, whose structure is based upon a tire configuration, as set out in the above identified U.S. patent application Ser. No. 09/943,814 for an "Air-No-Air Elastomeric Tire", that was filed Sep. 4, 2001. The inner support 46 includes a casing or body that is preferably formed from an elastomeric material, such as a urethane material, preferably utilizing spin casting methods like those described in apparatus and method patents, U.S. Pat. Nos. 5,906,836 and 6,165,397 that the present inventor is a co-inventor of. Though, it should be understood, the invention could be manufactured from other elastomeric materials, such as natural or synthetic rubber, and by other methods and apparatus from those shown in the above set out U.S. Patents, to include: molding techniques where a urethane or rubber material, in a liquid form, is poured into a mold; pressure molding of a rubber material where the material is squeezed, as in a mold, into a tire shape, or a like process or procedure, within the scope of this disclosure, to form the inner support 46 of the invention. It should therefore be understood that the inner support 46 component of the invention resides in the unique arch shaped interior cavity that provides load bearing structural strength, at atmospheric pressure within an interior cavity, and not in a particular manufacturing process or material used in that manufacture. The arch shaped cavity provides for supporting a load in compression at all times, with load forces directed around the arch and into the inner support 46 mounting points to rim 54. So arranged, the inner support 46 exhibits a load bearing ability without the arch shaped cavity being under pressure other than atmospheric to support a design or tire load upon deflation of the casing 35, as set out below. Which load, as the inner support 46 can support, is governed by the thickness or distance between the inner support 46 interior cavity wall 48 and the inner cavity outer surface 49, as shown in FIGS. 4 through 9.

Figure 5:
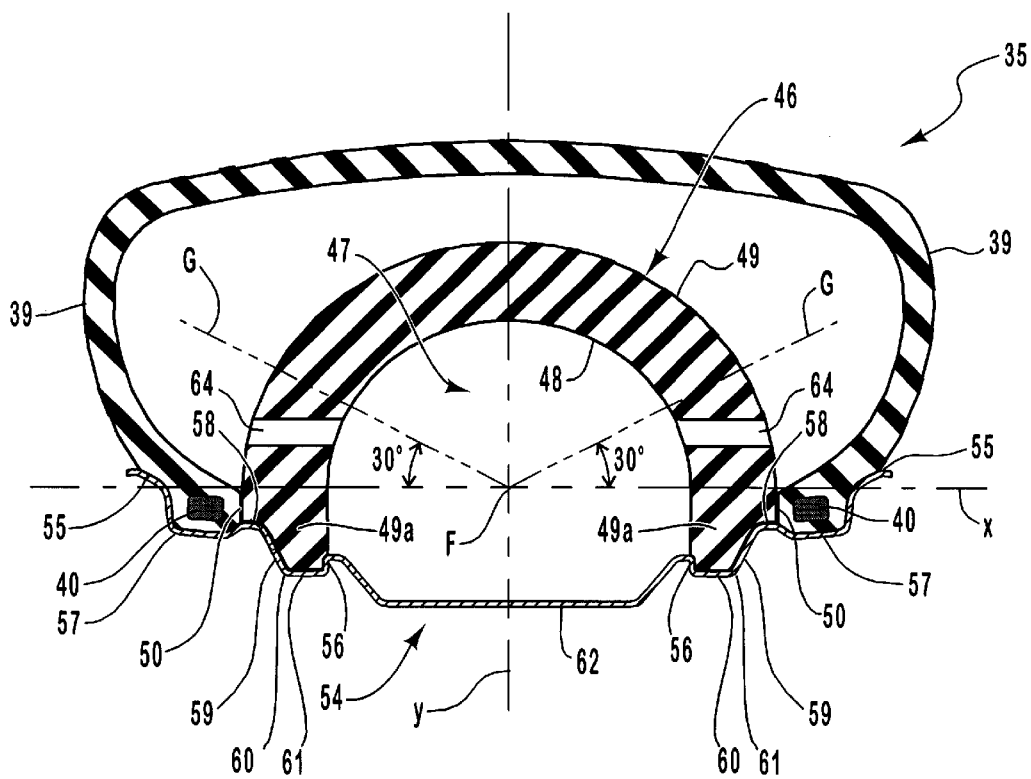
FIG. 5, shows the run flat tire of FIG. 4 that has been aired to a load bearing pressure and with the tire not under load.
Figure 6:
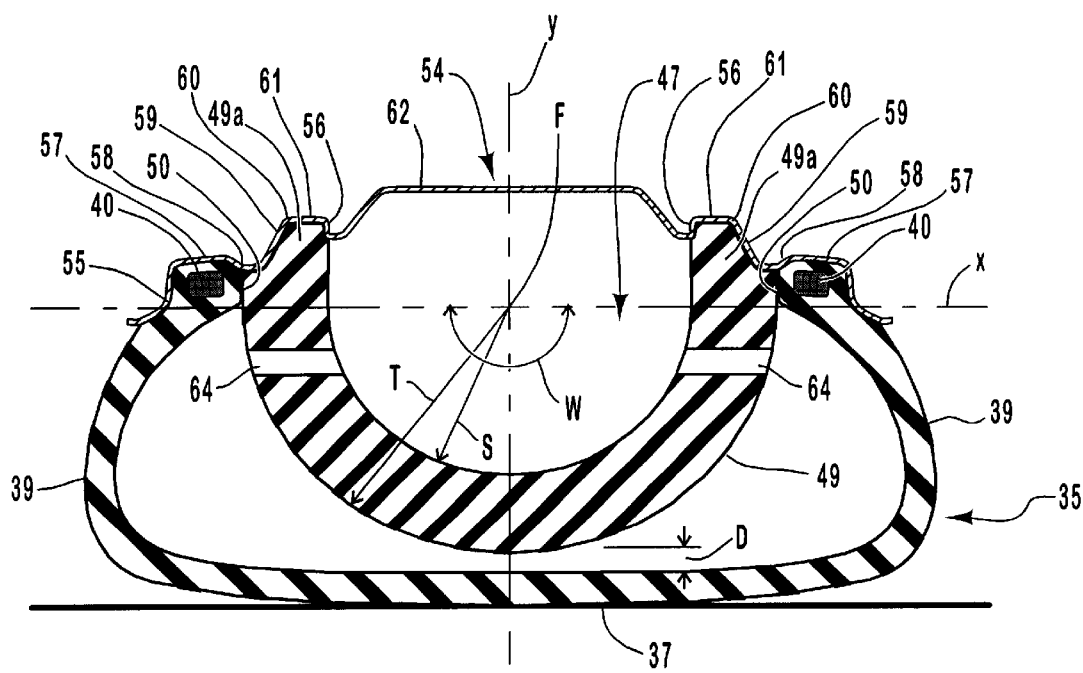
FIG. 6, shows the run flat tire of FIG. 5 under load;.

Heretofore, tires and load bearing tire like structures that have included cavities have not utilized the arch shape as a load supporting member, as does the invention. Unique to the invention, the inner support 46 arch shaped interior cavity 47 is a uniform curve, that is preferably an arc of from zero degrees at a horizontal line X, as shown in FIGS. 5 and 6, and extends from one inner support side through an arc or one hundred forty (140) to not more than one hundred eighty (180) degrees to the other inner support side. Which arc is shown in the figures as an arc of one hundred eighty (180) degrees. The line X is shown as a broken line that intersect a vertical line Y, that is shown as a broken line, that bisects the inner support 46, and the horizontal and vertical lines X and Y are shown meeting at point F. For this example, point F is the point of origin of a radius S for forming the arch shaped cavity inner wall 48, and a radius T forming the inner support outer surface 49, as shown in FIG. 6. So arranged, both the arch shaped cavity inner wall 48 and outer wall 49 are formed with one hundred eighty (180) degrees of arc, as illustrated by angle W, in FIG. 6. Which arc W, is shown as one hundred eighty (180) degrees that, it should be understood, is the maximum arc that the arch shaped cavity can be formed with to provide the inner support 46 with the required load bearing capability to support a design load, in compression, upon deflation of the casing 39. As set out above, the inner support 46 can be formed to have an arc of from one hundred eighty (180) degrees to not less than one hundred forty (140) degrees to provide the required load bearing strength.

It should be understood that the inner support 46 can be formed to have an arc of between one hundred forty (140) to one hundred eighty (180) degrees of arc, with the arc of the arch duplicated around the cavity wall 48 and the outer surface 49 that have a uniform thickness therebetween that is selected to support a load passed thereto from the deflated tire casing 39 tread 37, after tire deflation. In practice, shown in FIG. 6, the horizontal line X is drawn between a rim 54 hook ends 55 points of engagement with the tire casing 38 side wall ends, adjacent to beads 40 and the line Y bisects the tire 35. The horizontal line X passes through a contact point 50 between the tire casing inner surface adjacent to the bead 40 and outer surface of the end of the inner support, providing compressive engagement therebetween to maintain the tire casing 39 and inner support ends 49a together, between the rim 54 hook ends 55 and rim inner walls 56.

As set out above, the inner support 46 has a uniform wall thickness between the inner cavity wall 48 and the inner support outer surface 49 that is selected to provide a desired or design load bearing capacity when the inner cavity is at atmospheric pressure, as when the tire casing 39 has deflated. The inner support 46 is preferably formed from an elastomeric material, preferably a urethane material, that is a combination of an isocyanate and a polyol as a chain extender that are sprayed together in the spin casing process, as set out in the above identified U.S. Patent Application for an Air-No-Air Tire.

Shown in FIG. 4, a tire casing 39 is mounted at bead 40 ends of side walls 39 into outwardly curved outer hook ends 55 of rim 54. The tire casing 39, as identified as Prior Art in FIG. 2, is an example only of a tire casing that can be used with the inner support 46 to form the run flat tire 45. Shown in FIGS. 5 through 9, the rim 54 is preferably formed to accommodate the tire casing 39 with the inner support 46 fitted therein and with the tire casing bead 40 ends and inner support ends 49a maintained together in side by side relationship. To provide which relationship, the rim 54, across its annular portion, includes flat sections 57 that are adjacent to, and extend at approximately right angles inwardly from, each curved outer hook end 55. Which flat sections are each bent outwardly into a peak 58 that receives a the tire casing 39 bead 40 end. From each peak 58 the rim annular portion slopes inwardly at 59, terminating in a shoulder 60 of a flat section 61 that then terminates at the inward end of rim inner wall 56, and with each rim inner wall 56 located at the end of a rim web 62. So arranged, the rim web 62 extends between the rim inner walls 56 that engage the inner support ends 46a, maintaining the ends 46a against the tire casing 35 bead ends, and includes, as shown in FIG. 4, a valve stem 63 that is fitted through the rim web to pass air, under pressure, into the inner support 46 arch shaped cavity 48. Air, under pressure, as is passed through the valve stem 63, travels into the inner support 46 cavity to then pass therefrom through ports 64 that are formed in the inner support side walls. Wherefrom, the air under pressure travels into the tire casing 39, airing up the run flat tire 45.

To avoid any diminishment of the load bearing strength of the inner support 46, the ports 64 are spaced randomly around the inner support walls, in the wall area below lines G, shown as broken lines in FIG. 5, that are each at a thirty degree angle from the horizontal line X taken from the intersection F of the horizontal and vertical lines X and Y. It has been determined that the load bearing strength of the inner support 46 is not diminished so long as the ports 64 as are formed through the walls of the inner support 46 are randomly spaced in the wall area below broken line G and are of a diameter of from one sixteenth to one eighth of an inch. So arranged, the support integrity that is inherent to the arch shaped cavity will be essentially unchanged from an inner support 46 without ports 64, providing for a transfer of a load from the tire casing that is applied to the inner support outer surface 49, upon tire casing deflation, with which load being transferred through the inner support walls and into the rim 54.

In practice, a standard run flat tire will be anticipated to support approximately twenty five hundred (2500) pounds of compressive load when it is properly inflated and will be expected to safely support a vehicle load for a target distance of approximately fifty miles, and at a speed of fifty to fifty five miles per hour. Accordingly, to support this anticipated target load, the inner support 46, without the inclusion of beads, belts and/or plys, will be formed with a sufficient wall thickness to support this anticipated load. Which thickness, in practice, is a uniform distance between the inner support 46 inner and outer surfaces 48 and 49, respectively, of approximately one half of an inch. For the one half inch wall thickness, the inner support load bearing strength can be increased by the inclusion of beads, belts and/or plys, fitted therein during the manufacture of the inner support. Or, alternatively, the desired load bearing strength of the inner support 46 can be maintained with a less wall thickness by the inclusion of beads, belts and/or plys, within the scope of this disclosure.

Figure 7:
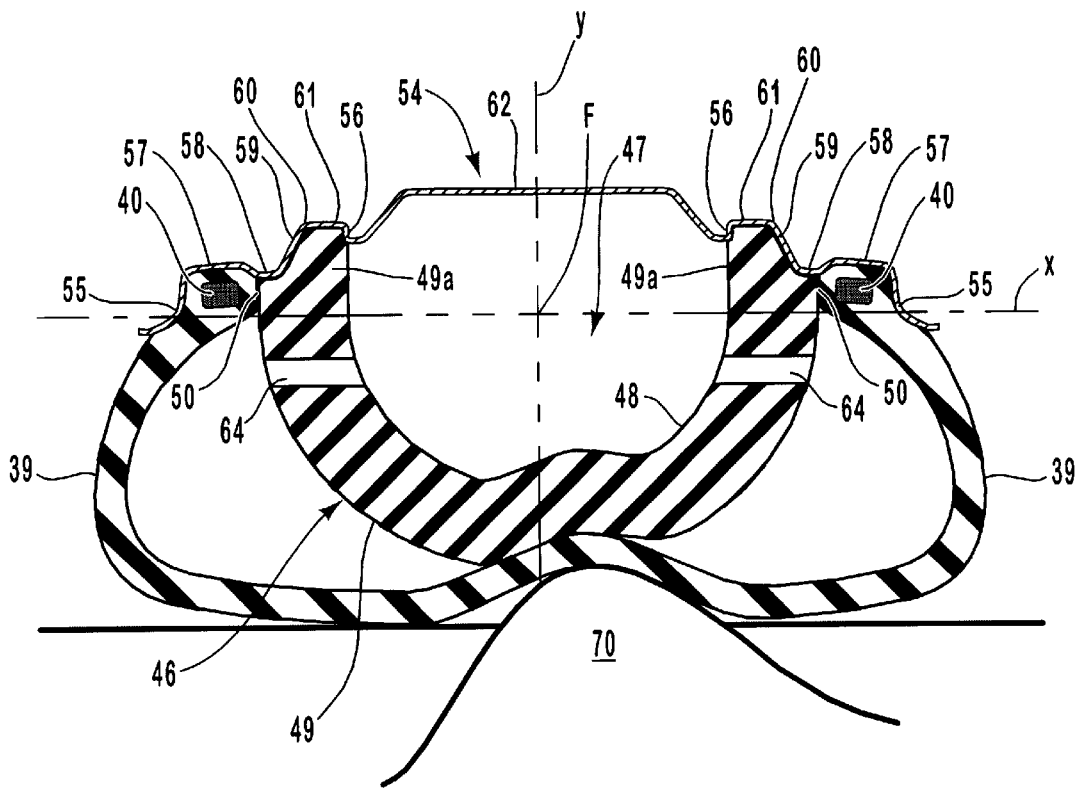
FIG. 7, shows the run flat tire of FIG. 6 with the tread shown as having flexed inwardly into the inner support by contact with a bump, illustrating a resiliency that is provided by the inner support.
Figure 8:
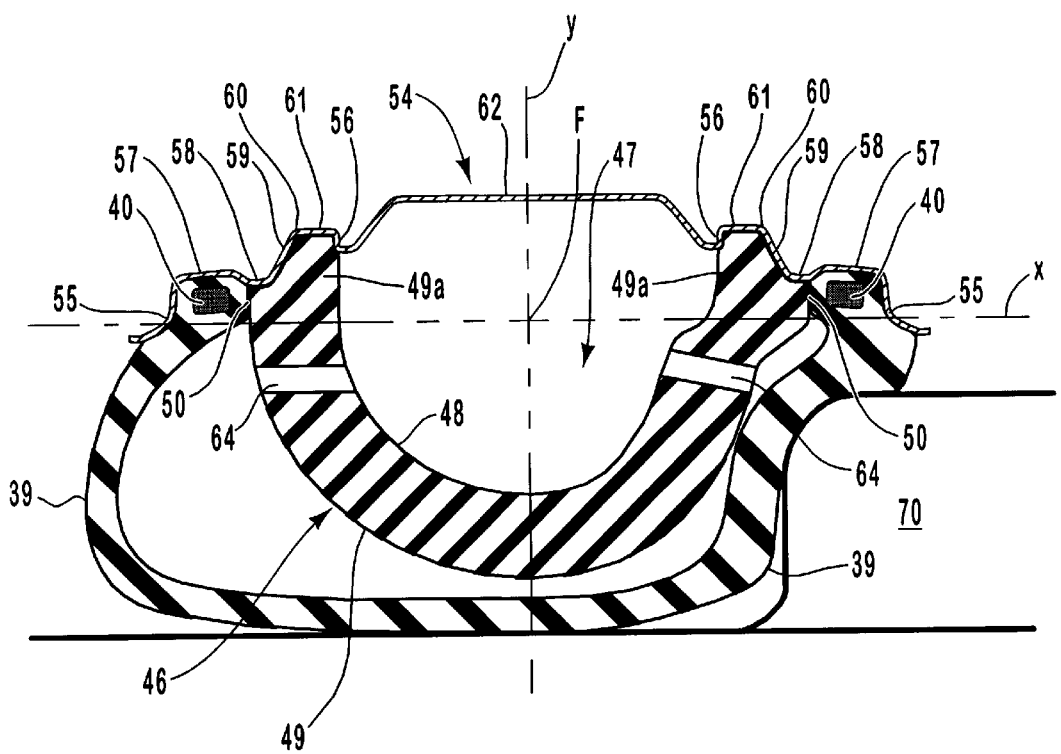
FIG. 8, shows the run flat tire of FIG. 6 side wall as having been displaced inwardly into the inner support side wall, as by contact with a curb, illustrating the resilient side support provided by the inner support and the stability of the rim to tire mounting of the casing and inner support.
Figure 9:
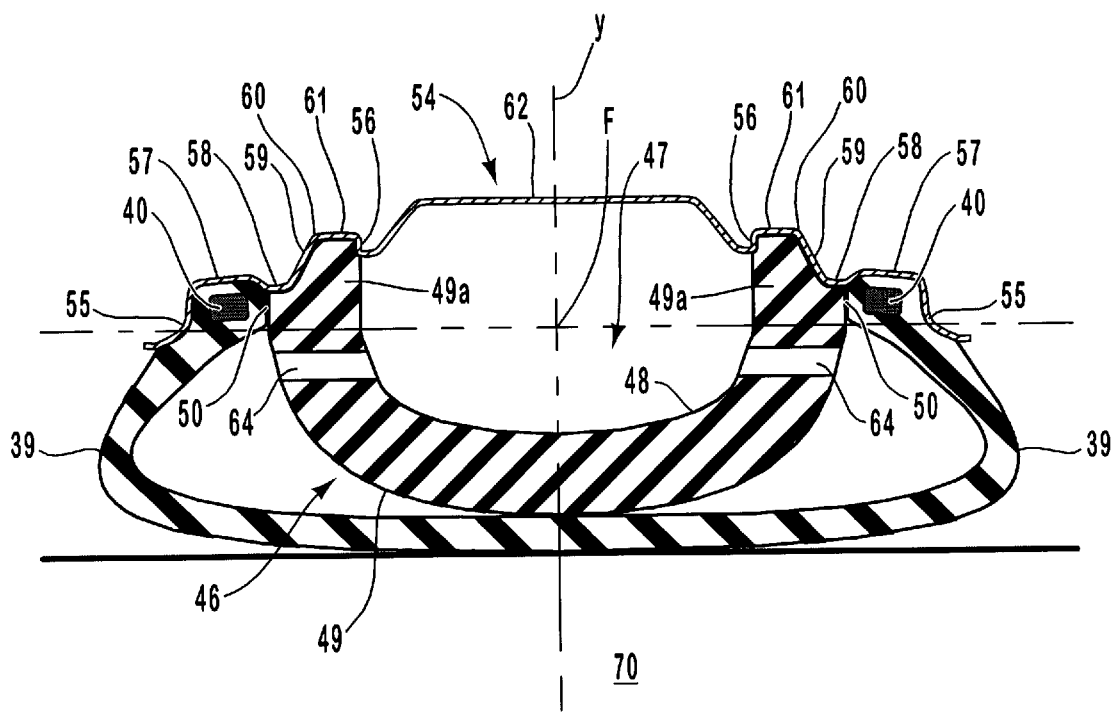
FIG. 9 shows the run flat tire of FIG. 6 after the casing has been deflated, with the casing tread shown as having collapsed against the inner support top surface that takes up the tire load.

In an inflated state, as shown in FIG. 6, there will be a distance or space D between the inner support outer surface 49 and the inner surface of the tire casing 35 inner surface, below the tread 37. The distance D, in practice, is not less than one quarter of an inch and is preferably no more than three quarters on an inch. The spacing should be such that the inner support outer surface does not contact the tire casing 35 surface under the tread 37 during normal tire 45 turning under load, but is a short enough distance that, upon tire deflation, as illustrated in FIG. 9, will allow a minimum flexing or folding of the tire casing 35 side wall 39 before the load is taken up by the inner support 46. So arranged, with continued tire rolling under load, after deflation, the inner support 46 will carry the load, with minimum tire casing side wall 39 flexure, thereby reducing a creation of heat in the tire casing due to tire casing flexure, or hysteresis. Further, a close spacing between the inner support 46 outer surface 49 and the inner surface of the tire casing 35, under the tread 37, allows the inner support to act as a shock absorber when the tire casing 35 is forced against the inner support 46, as illustrated in FIGS. 7 and 8. Shown in FIG. 7, the run flat tire 45 has run over a raised item, such as a rock 70, causing the tire casing 35, at the tread 37, to be depressed by contact with the rock 70 urging it into contact with the inner support 46, depressing that inner support outer surface 49 that then rebounds, acting as a shock absorber, to cushion the tire 45 ride. Similarly, in FIG. 8, the tire casing 35 side wall 39 is shown as having been forced into the side of the inner support by tire 45 contact with a curb 71. The contact of the tire casing side wall 39 with the inner support 46 causes the inner support to flex inwardly and then rebound, taking up a side force as could displace the tire bead 40 mounting onto the rim 54 hook end 55, both maintaining the tire 45 air seal, and providing a shock absorption to the tire casing 35 side wall 39.

Summarizing, the tire casing 35 is preferably a standard pneumatic tire, like the tire 35 of FIG. 2, and the inner support 46, as set out above, is formed to resemble a conventional tire, less the outer tread. The inner support 46 is arranged for mounting at ends 50 to a rim to fit around an inner surface and against a rim 54 step 56. The inner support 46 ends 50 each have an inner face that is in contact with the bead 40 end of the tire casing 35 side wall 39, with the opposite bead 40 end surfaces maintained against rim outwardly curved hook ends 55. The tire casing bead 40 ends and inner support ends are maintained tightly together, with the inner support ends 55 tending to expand when a load is directed therein through the arch and outwardly expand against each of the tire casing bead 40 ends, further locking the tire casing and inner support ends onto the rim 54. While not shown, as set out above, it should be understood that the inner support 46 ends 55 can include beads, not shown, to further stiffen the inner support 46 and tire casing 35 mounting in the rim 54, within the scope of this disclosure. Additionally, the inner support can include a belt or belts, not shown, and/or plys, for increasing the inner support load bearing strength and/or to allow for the construction of a inner support of lesser wall thickness that will still support the design load, within the scope of this disclosure.

A preferred embodiment of the run flat tire of the invention has been shown and described herein. It will, however, be apparent to one knowledgeable or skilled in the art that the above described embodiment may incorporate changes and modifications without departing from the general scope of this invention. Which invention therefore is intended to include all such modifications and alterations in so far as such comes within the scope of the appended claims and/or a reasonable equivalence thereof

I claim:

1. A run flat tire comprising, a tire casing having side walls that include beads embedded in side wall ends for mounting in a tire rim, and with upper portions for said side walls spanned by a tread section; an inner support formed to fit within the tire casing having side walls whose ends are arranged for mounting in said tire rim, alongside and against said tire casing bead ends, which said inner support is formed from an elastomeric material and has an interior continuous arch shaped cavity, where the arc of said interior arch shaped cavity is centered under a tire casing outer portion, under said tire casing tread, and the inner support walls and inner support top portion have a same uniform thickness and said inner support includes a plurality of holes formed through said inner support side walls at random intervals around both said inner support side walls, below an angle of thirty degrees upwardly on each said side wall from a horizontal axis across said inner support that intersects mounting points of said inner support side walls to sides of said tire rim, and as taken from a point of intersection of a longitudinal line bisecting said inner support and said horizontal axis; and means for passing air under pressure into said tire casing.

2. The run flat tire as recited in claim 1, wherein the inner support continuous arch shaped cavity and the inner support outer surface have like uniform arcs of from one hundred forty (140) to one hundred eighty (180) degrees, with a uniform thickness across said arches that is selected to carry, with the arch shaped cavity at atmospheric pressure, the load as the tire casing supports when said tire casing is inflated; and including means for mounting said tire casing beads and inner support side wall ends side by side in the rim.

3. The run flat tire as recited in claim 1, wherein the means for passing air under pressure into the tire casing is a valve stem that is installed through the rim and opens into the inner support arch shaped cavity; and the inner support plurality of holes pass air, under pressure, therethrough and into the tire casing interior.

4. The run flat tire as recited in claim 3, where the holes formed through the inner support side walls are from one eighth to one quarter of an inch in diameter.

5. The run flat tire as recited in claim 1, wherein the thickness of the material between the inner support arch shaped cavity and inner support outer portion surface is selected to support, when said inner arch shaped cavity is at atmospheric pressure, an anticipate load as is directed therein through the tire casing tread as when said tire casing has been deflated and contacts said inner support outer portion surface.

6. The run flat tire as recited in claim 1, wherein the tire casing is a standard tire having beads, belts and plys, and said bead ends are each formed to resist passage out of the rim, and to butt against an adjacent end of the inner support wall in said rim upon tire deflation.

7. The run flat tire as recited in claim 6, wherein the rim includes outwardly curved hook ends formed around opposite rim sides whereagainst the tire casing side wall bead end is fitted that connect, along lower edges, to a flat rim section that receives said tire casing bead end, and said rim flat sections each slope outwardly, each into a peak, whose apex aligns with contacting surfaces of said tire casing bead end inner face and an outer face of the inner support, and which said rim is sloped radially inwardly from a lower inner end of each said peak to flat sections formed across said rim, and each of which said flat sections is stepped outwardly as an end of a rim web that extends across said rim, and said tire casing bead ends and inner support side wall ends are supported, along side one another, between said rim outwardly curved hook ends and said outwardly stepped sections adjacent to said rim web.

8. The run flat tire as recited in claim 1, wherein the inner support is formed from a elastomer by molding methods.

9. The run flat tire as recited in claim 8, wherein the inner support is formed by spin casting methods.

10. The run flat tire as recited in claim 1, wherein the inner support is formed form natural or synthetic rubber.

11. The run flat tire as recited in claim 1, wherein the inner support is formed from an isocyanate and polyol as a chain extender that are combined together as sprays that are directed into a spin casting apparatus wherein the tire is formed.

\* \* \* \* \*